United States Patent

[11] 3,586,934

| [72] | Inventor | Roy Nakata |
| | | Bryn Mawr, Pa. |
| [21] | Appl. No. | 817,848 |
| [22] | Filed | Apr. 21, 1969 |
| [45] | Patented | June 22, 1971 |
| [73] | Assignee | General Electric Company |

[54] HIGH VOLTAGE CERAMIC CAPACITOR ASSEMBLY AND METHOD OF MAKING SAME
16 Claims, 10 Drawing Figs.

| [52] | U.S. Cl. | 317/261, 29/25.42 |
| [51] | Int. Cl. | H01g 3/06 |
| [50] | Field of Search | 317/261; 1/242; 29/25.42 |

[56] References Cited
UNITED STATES PATENTS

| 2,437,212 | 3/1948 | Schottland | 317/261 |
| 3,103,734 | 9/1963 | Hurley | 29/25.42 |
| 3,137,808 | 6/1964 | Coda | 317/261 X |
| 3,235,939 | 2/1966 | Rodriguez | 317/261 UX |
| 3,325,708 | 6/1967 | Mankoff | 317/261 |

Primary Examiner—E. A. Goldberg
Attorneys—J. Wesley Haubner, William Freedman, Frank L. Neuhauser and Melvin M. Goldenberg ABSTRACT: A high voltage ceramic capacitor comprising a stack of ceramic blocks electrically connected in series. Each block has an outer peripheral surface, a pair of opposed planar end faces, and a conductive coating bonded to each end face. The juxtaposed coatings of adjacent blocks are bonded together to form a bonded stack. The outer periphery of the bonded stack is ground smooth so as to cause the conductive coatings to have their peripheral edges precisely aligned with the periphery of the ceramic immediately thereadjacent about the entire peripheral edge of each conductive coating. A thin layer of dielectric material covers the periphery of the stack.

PATENTED JUN 22 1971 3,586,934

INVENTOR:
ROY NAKATA,
BY *William Freedman*
ATTORNEY

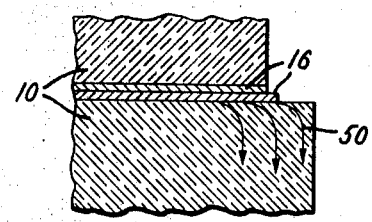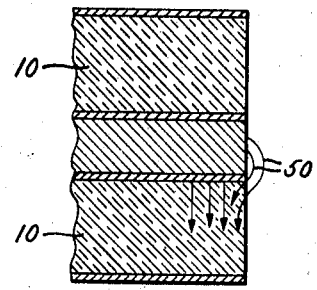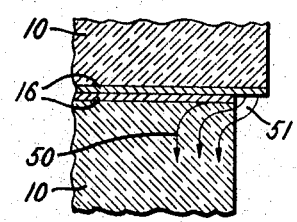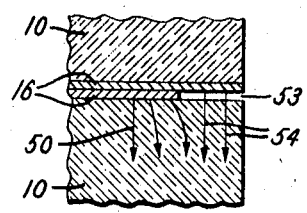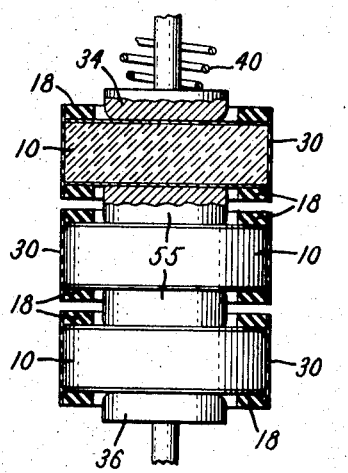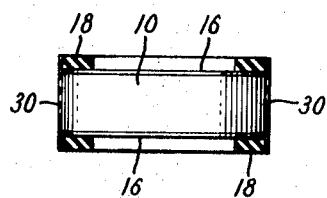

HIGH VOLTAGE CERAMIC CAPACITOR ASSEMBLY AND METHOD OF MAKING SAME

This invention relates to a high voltage ceramic capacitor assembly and, more particularly, a capacitor assembly of this type which comprises a stack of series-connected ceramic discs or blocks each having a pair of metal electrodes on its opposed end faces. The invention is also concerned with a method of making such a ceramic capacitor assembly.

Typical capacitor assemblies of this type are shown in U.S. Pat. No. 3,325,708-Mankoff and Nakata, assigned to the assignee of the present invention, and in U.S. Pat. No. 2,840,670-Leeds et al. In these capacitor assemblies, the electrodes on the opposite faces of each disc are constituted by silver coatings covering these faces and terminating near the outer periphery of the disc. High electrical stress concentrations occur near the outer edge of this silver coating; and to prevent dielectric breakdowns from being initiated in this region of high stress concentration, a thick encapsulating jacket of insulating resin is provided to completely cover this edge and the periphery of the ceramic disc.

This encapsulating jacket is difficult to apply, is expensive, and does not readily lend itself to use in very high pressure environments that are subject to rapid drops in pressure. Such pressure drops produce a sudden expansion of any high pressure gas that might be absorbed in the jacket, and such expansion can produce cracks or holes in the jacket material.

An object of my invention is to eliminate the need for this thick jacket of insulating resin enveloping the edge of the metal electrode.

Another object is to reduce the electric stress concentrations that tend to develop near the outer edge of the thin metal electrodes on the ceramic discs.

Another object is to construct the ceramic capacitor assembly in such a manner that it can withstand higher voltages than prior ceramic capacitor assemblies of comparable length.

The ceramic discs of the capacitor assembly of the aforementioned Mankoff and Nakata patent are separate elements that must be held in place by a tubular housing and a spring-type clamp at the end of the tubular housing. In another prior capacitor assembly that I am aware of, separate ceramic capacitor elements, each provided with a thick resin jacket, are held in place by threaded connections between the elements and a tubular housing around the elements. Such housings, clamps and connections are expensive and consume an undue amount of space. Moreover, the threaded connections are susceptible to being accidentally over tightened, and this could damage an electrode of the assembly.

Another object of my invention is to provide a highly compact, mechanically self-sustaining ceramic capacitor assembly that requires no complex supports or housings, or threaded connections between the ceramic elements.

For a better understanding of the invention, reference may be had to the following description taken in conjunction with the accompanying drawings, wherein:

FIGS. 5, 6, 7 and 8 illustrate certain electrical field relationships present in capacitor assemblies lacking certain features of my invention.

FIG. 9 is a sectional view of a modified embodiment of my invention.

FIG. 10 is a sectional view of a capacitor assembly comprising units constructed as shown in FIG. 9.

Figure 1:
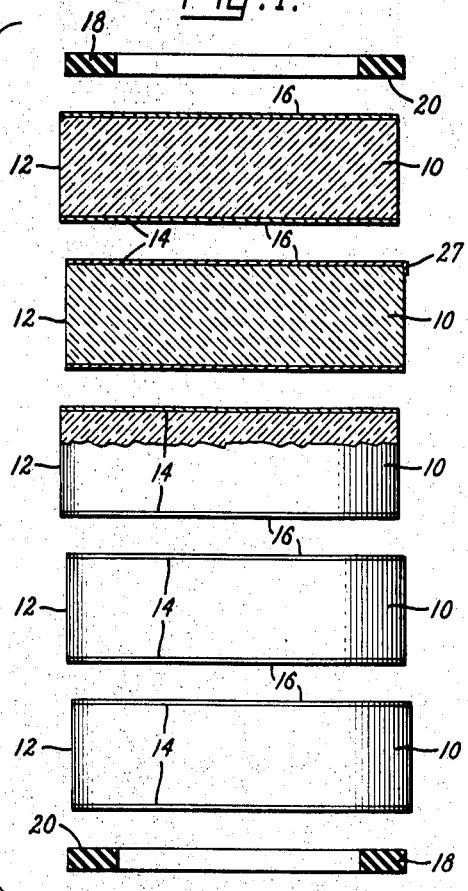
FIG. 1 is a partially-sectional view showing the basic parts of a capacitor assembly embodying one form of my invention prior to their incorporation in the assembly.

Referring now to FIG. 1, I show a plurality of ceramic capacitor blocks 10 each having a cylindrical outer surface 12 and a pair of planar faces 14 at opposite ends of the block extending perpendicular to the outer peripheral surface. Each planar face 14 is covered by a thin coating of conductive material bonded thereto. Preferably, this coating is a silver dispersion fused integrally onto the ceramic face 14. Each of the ceramic blocks 10 is made of a ceramic material having a high dielectric strength and a high dielectric constant, such as, for example, barium titanate. A typical dielectric constant is in the range of several hundred to several thousand relative to that of air.

Also forming a part of the capacitor assembly are two end blocks or rings 18 made of an electrical insulating material such as glass-reinforced polyester or a suitable ceramic. Each of these end rings 18 has a planar face 20 on one surface. The parts shown in FIG. 1 are bonded together in generally aligned relationship to form the capacitor stack 22 shown in FIG. 2. For bonding the ceramic blocks together I provide a suitable bonding agent between the juxtaposed faces of juxtaposed coatings 16 of adjacent blocks that provides an adherent bond between said coatings. One such bonding agent is an epoxy cement filled with highly dispersed silver or other conductive particles. Another appropriate bonding agent is a suitable silver-bearing solder applied between the juxtaposed coatings 16. A suitable epoxy cement can be relied upon to bond the end rings 18 to the outer conductive coatings 16 of the stack.

Figure 2:
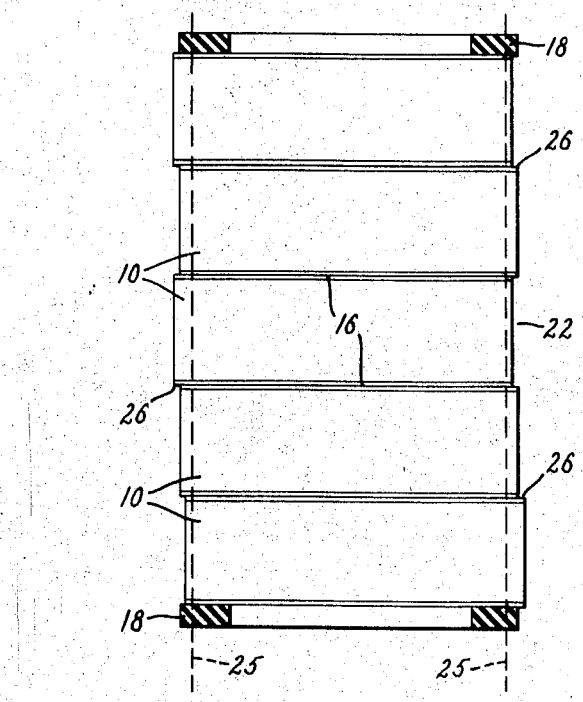
FIG. 2 is a view partially in section showing the parts of FIG. 1 in assembled relationship.

After the bonding agent has been cured or otherwise set to render the stack of FIG. 2 a self-sustaining rigid structure, the periphery of the bonded stack is machined, preferably by a centerless grinding process. Enough material is removed from the periphery of the stack by the grinding process to develop a smooth cylindrical periphery that is located in a position indicated by dotted lines 25. The grinding process produces virtually perfect alignment between the cylindrical outer peripheral surfaces of all the ceramic elements. Any surface projections such as shown in FIG. 2 at 26, which might have resulted from differences in diameter of the blocks, from out-of-roundness, or from slight misalignments of the blocks, are removed by the grinding process. The portions of the conductive coating 16 which were located radially outside of the dotted lines 25 are also removed by the grinding process; and, of great importance, the peripheral edge of each conductive coating 16 is located precisely flush with the final peripheral surface 12 of the adjacent ceramic and is in virtually perfect alignment with said peripheral surface 12. It has been found that, typically, after the centerless grinding operation, none of the parts in the region of a conductive coating have their outer surfaces more than one mil out of alignment at any point around the entire periphery of the stack.

An important factor that contributes to the above-described precise alignment about the entire peripheral edge of the metal coating 16 is the absence of any chips in the peripheral edge of the coating. The metal coating is relatively fragile, and grinding does have a tendency to produce tiny peripheral chips in this coating. But I am able to avoid these chips because I sandwich each of the metal coatings between two relatively strong parts in intimate engagement with the coating around the entire area being ground. In this respect, note that each of the metal coatings 16 at the end of the stack 22 is sandwiched between intimately-engaging end ring 18 and an adjacent ceramic disc 10 during the grinding operation. Likewise, all the other coatings 16, which are spaced from the ends of the stack, are respectively sandwiched between immediately adjacent ceramic elements 10 during the grinding operation. The avoidance of peripheral chips in the conductive coatings 16 is important because such chips can be a source of dielectric breakdown along the length of the stack.

During the grinding operation the sandwiching effect described in the immediately-preceding paragraph acts not only to prevent tiny chips from developing in the peripheral edge of the silver coating but acts also to prevent tiny chips from developing in the ceramic material immediately adjacent the peripheral edge of the silver coating. In the absence of this sandwiching effect, such chips in the ceramic are not infrequently produced by the grinding operation. The chipped-away ceramic particle may be completely removed by the grinding operation or may remain in position due to an incomplete crack in the ceramic or due to the retaining effect of the adjacent silver coating, which might possibly still be intact. In either case, however, the presence of the ceramic chips results in a high electric stress concentration which can be a source of dielectric breakdown along the stack length.

The above-mentioned centerless grinding operation can be performed in a suitable centerless grinding machine of conventional construction. In such a grinding machine the work is rotated and simultaneously moved longitudinally while a high-speed rotating grinding wheel is pressed against its surface. Since the details of this machine form no part of my invention, they are not shown in the drawing and will not be further described. If more information on such machines is desired, reference may be had to pages 562—565 of the book, *Metal Processing*, by O.W. Boston, Second Edition, published in 1951 by John Wiley and Sons.

After the stack of FIG. 2 has been ground as above-described to provide a smooth periphery along its entire length, the stack periphery is coated with a thin layer or film of dielectric material. This dielectric coating, which is depicted at 30 in FIG. 3, typically has a thickness of about 2 mils. This thickness is greatly exaggerated in the drawing. A suitable material for the coating is an epoxy or polyester resin, a silicone varnish, or a polyester varnish. The purpose of the thin dielectric coating is to suppress field emission and microdischarge initiated breakdowns from the edge of the silver coatings 16. The dielectric coating must have a high resistivity, preferably in the neighborhood of $10^8$ ohm-centimeter, but this resistivity should be a finite value in order to avoid trapped-charge-initiated breakdowns. The dielectric coating should preferably cover the entire peripheral surface of the stack, but my invention in its broader aspects comprehends a dielectric coating that covers only the outer peripheral edge of the metal coatings and the immediately-adjacent peripheral surfaces of the ceramic material. Coverage of the insulating end rings 18 is not important except insofar as it facilitates coverage of the outer peripheral edge of the juxtaposed end electrodes 16. The relative dielectric constant of the coating material is typically about 3 to 5.

It is to be noted that, in applying the silver coating 16 to the individual ceramic elements 10 during their manufacture, no great care need be taken to terminate the conductive coatings precisely at the periphery of the block. If, by chance, coating 16 terminates in an irregular edge just short of the periphery or happens to spill over onto the periphery, as indicated at 27 in FIG. 1, I can still use the block without further processing it prior to its incorporation in the stack 22. This is made possible by the above-described grinding process to which I subject the bonded stack of FIG. 2. By grinding the stack periphery sufficiently, I can locate the new periphery of the coating radially inward of any previously-existing irregularities in the original outer margin of the conductive coating, thus removing these irregularities and providing a smooth peripheral edge that is aligned virtually perfectly with the finished periphery of the adjacent ceramic material.

Efforts have been made to align the peripheries of the ceramic discs without subsequent machining of the stack as above-described but simply by bonding the discs in appropriate positions with respect to each other. However, because of the out-of-roundness, differences in diameter, and problems produced by thermal expansion, peripheral alignment in the resultant bonded stack has typically been quite poor. Adjacent ceramic discs in typical stacks built in this manner contain misalignments of 25 mils and even more at various peripheral points. Moreover, even if the peripheries of prior ceramic discs could be lined up perfectly, the silver coatings thereon still would not have their peripheries perfectly aligned. The irregularities and chips which have typically been present in the peripheral edges of such coatings have precluded precise alignment at all peripheral points. Such misalignments are eliminated by my stack-grinding operation.

The capacitor stack of FIG. 2 is a highly compact structure inasmuch as there are no thick spacers between the ceramic blocks, as have typically been present in prior designs. One of the reasons for including such spacers was to provide room for accommodating the thick jacket of insulating resin which has typically been used to cover the outer peripheral portion of the conductive coating on the ceramic block. I am able to eliminate this jacket because I have greatly reduced the electric stress concentrations that have been present at the peripheral edge of the conductive coating by reason, in part, of the virtually perfect alignment that is present between this peripheral edge and the adjacent ceramic. With the thick jacket eliminated, I can bond the coatings 16 of adjacent capacitor elements directly to each other, as above described. The thinness of this joint between coatings 16 is another factor in reducing the stress concentrations adjacent its outer peripheral edge, as will soon be explained in more detail.

The fact that all the ceramic blocks are bonded together is also advantageous because it makes the capacitor assembly a one-piece unit that can be easily handled with less chance for damage.

Figure 3:
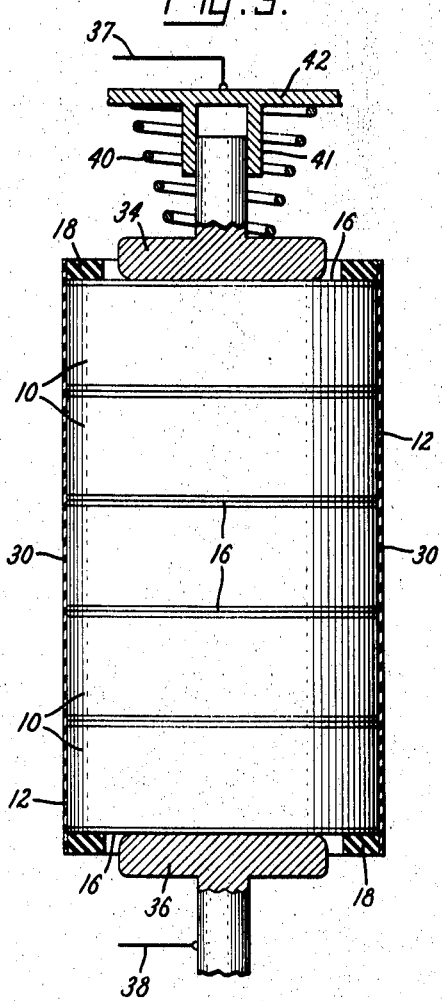
FIG. 3 is a view partially in section of the capacitor assembly of FIG. 2 shown mounted in its end fixtures.

For connecting the capacitor stack in a high voltage electric circuit, I provide a pair of metal terminals 34 and 36, shown in FIG. 3, which are themselves connected in a high voltage circuit 37, 38. Electrode 36 is a stationary member engaging the bottom of the stack, whereas the other electrode 34 is capable of limited movement and is biased downwardly by a spring 40 into engagement with the top of the stack. The upper electrode is guided by a tubular guide 41 fixed to a stationary metal part 42. Current is carried to and from the upper electrode via a path extending through part 42 and spring 40.

A typical application for my capacitor assembly is in an air-blast circuit breaker, such as shown in FIG. 3 of the aforesaid Mankoff and Nakata patent. There, two capacitor assemblies, each comparable to my assembly of FIG. 3, are disposed in a tank filled with high pressure air and are used for voltage-distribution purposes.

For such applications, it is especially advantageous to eliminate the thick resin jacket previously used to encapsulate the capacitor elements. The high pressure gas in the tank space about the jacket tends to infiltrate the resin, and a sudden pressure drop in the tank pressure will produce a sudden expansion of this air, which can produce objectionable voids or fissures in the jacket material. The thin coating 30 which I have provided about my stack is so thin, e.g. 2 mils, that it offers no significant impedance to air release during the above-described expansion. Hence, coating 30 is not susceptible to damage from such gas expansion.

Figure 4:
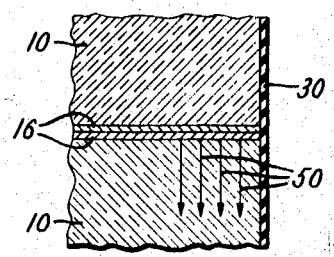
FIG. 4 illustrates certain electrical field relationships present in the capacitor assembly of FIG. 3.

Assuming that a high voltage is applied between the end terminals 34 and 36 of FIG. 3, the electric field present in the capacitor assembly is exceptionally uniform and free of stress concentrations. The region in which it has been found most difficult to avoid stress concentrations is the region immediately adjacent the outer edge of the conductive coating 16 on each ceramic element. For a number of reasons I have been able to greatly reduce the stress concentrations in this region. A primary reason is that my conductive coating extends all the way out to the periphery of the stack and is terminated precisely flush with the periphery. This flush relationship is maintained about the entire periphery of the stack, and there are no chips in the periphery of the coating or the immediately-adjacent ceramic material to defeat this precise flushness, as was explained hereinabove. Misalignments of the immediately adjacent peripheries can be limited to less than one mil by grinding the bonded stack, as described above. Another factor contributing to reduced stress concentrations at the edge of coating 16 is the extreme thinness of the metal junction structure between the two ceramic elements, e.g., in a preferred embodiment this thickness is only several mils. These relationships tend to force all lines of electrical flux emanating from the metal junction structure in this crucial region to enter the ceramic material perpendicular to the planar face of the conductive coating, as indicated in FIG. 4, where the electrical flux lines are indicated at 50. These lines of electric flux, upon entering the high dielectric constant ceramic, do not bulge outwardly, as they would if the coating terminated short of the periphery, as shown in FIG. 5. (Such bulging of the flux lines connotes an electric stress concentration in this particular region.) Nor are there significant lines of electric flux emanating from regions of the metal spaced from the metal-ceramic interface and crowding around the edge of the metal coating as they enter the high dielectric constant ceramic, which is another condition indicative of high stress concentration. This latter condition becomes more pronounced as the metal joint structure becomes thicker, as is indicated in FIG. 6; but I am able to render it essentially insignificant in reducing breakdown voltage by keeping the metal joint structure very thin, i.e., under about 15 mils. In a preferred embodiment, this thickness is under 5 mils. In view of this less than 15 mils thickness, it should be apparent that the juxtaposed faces of the conductive coatings 16 that are located between the ceramic capacitor blocks 10 are free of any insulating coating greater than 15 mils in thickness.

Another feature that contributes to uniformity of the electric field in the ceramic and freedom from stress concentrations is the particular manner in which the stack is constructed at its opposite ends. The end rings 18, it is to be noted, are of insulating material and not metal. Hand these end rings been of metal, then significant lines of electric flux would emanate from regions of the metal ring spaced from the metal-to-ceramic interface to produce a crowding of these lines around the edge of the coating similar to that illustrated in FIG. 6. An undesirable crowding of flux lines similar to that depicted in FIG. 5 also occurs if the ceramics are misaligned, even though the coating on each ceramic might terminate precisely at the peripheral surface of the ceramic. This condition is depicted in FIG. 7, where the flux lines emanating from the overhanging portion of upper coating 16 crowd around the edge of the lower coating 16 as they enter the lower ceramic. Note also that these flux lines at 51 pass through the surrounding medium, which is of relatively low dielectric constant, before entering the high dielectric constant ceramic, thus concentrating electrical stresses in the lower dielectric constant medium at 51.

If the ceramic peripheries are precisely aligned but the peripheral edges of the coatings are not, as is depicted in FIG. 8, then undesirably high electric stresses will occur in the gap 53 between the upper coating 16 and the lower ceramic block. Referring to FIG. 8, the electric flux lines 54 emanating from overhanging portion of the upper coating 16 would first pass through the gap 53 of low dielectric constant material before entering the high dielectric constant ceramic, thus objectionably concentrating electrical stresses in the low dielectric constant gap material. In the assembly of FIG. 8 there would also be a bulging outward of the flux lines emanating from the lower coating 16 adjacent gap 53, thus further detracting from the desired uniformity of electric field. The relationship depicted in FIG. 8 can occur if there is a chip in one of the metal coatings 16; and, as a matter of fact, FIG. 8 could represent a sectional view through the assembly at such a chip.

It is to be further noted that the electrodes 34 and 36 and all other metal structure immediately adjacent the outermost conductive coating 16 are disposed radially inwardly by a substantial distance from the outer peripheral edge of conductive coatings 16. Had there been the usual cuplike terminal structure having a lip surrounding the end of the stack, flux lines emanating from these structures would enter the high dielectric constant ceramic at points spaced from the end coating 16, thus producing a highly stressed gap outside the stack and adjacent its periphery which could be a source of dielectric breakdown problems.

I am aware of commercially available capacitors that are made by bonding together two ceramic blocks identical to applicant's blocks 10 of FIG. 1 and encapsulating them in a thick jacket of insulating material. These ceramic blocks have silver coatings on their opposed faces and are disposed in generally aligned relationship. Electrical tests have been made with such capacitors to compare them with two-element capacitors made by applicant's above-described method. It has been found that such capacitors can reliably withstand a maximum voltage of only 90 Kv. applied between opposite ends thereof. Capacitors made by applicant's above-described method and employing two ceramic elements of the same size as the tested commercially available capacitor can reliably withstand 140 Kv. This drastic increase in withstand voltage by over 50 percent is unexpected, particularly so, since it is obtained without the thick insulating coating used in the prior capacitor.

My invention in certain of its broader aspects is intended to comprehend an assembly comprising a single ceramic block constructed as illustrated in FIG. 9. In this embodiment, end rings 18 corresponding to end rings 18 of FIGS. 1 and 2 are bonded to the silver coatings 16 of the ceramic block to form a bonded assembly; and the periphery of this bonded assembly is ground to a smooth cylindrical form in a centerless grinding machine. Sufficient grinding takes place to bring the peripheral edge of each coating 16 into precise alignment with the peripheral surface of the adjacent ceramic material. The end rings 18 protect the peripheral edge of the coating 16 against chipping in the same manner as explained relative to FIG. 2. After the grinding operation, a thin coating 30 of dielectric material having a thickness, preferably, of a few mils, e.g. 2 mils, is applied to the periphery of the assembly.

The assembly of FIG. 9 can be used singly between two terminals such as 34 and 36 of FIG. 3 or can be used as one of the units of a stack consisting of a plurality of such units connected in series by conductive buttons in the general manner shown in the aforesaid Mankoff and Nakata patent. A stack of this latter type is depicted in FIG. 10, where the conductive buttons between the capacitor units are shown at 55. These buttons are unattached to the capacitor units and contact the bare central region of coatings 16. Terminals 34 and 36 corresponding to the identically designated terminals of FIG. 3 are provided, and a compression spring 40 urges all of these parts together.

Although I prefer to use a grinding machine for obtaining the above-described smooth surface on my capacitor stack, it is to be understood that other suitable types of machine tools, preferably of the abrading type, can instead be used for this purpose. The machining operation should, however, at least be capable of limiting misalignments in the region of a conductive coating to less than 5 mils. With a centerless grinding machine, misalignments of less than 1 mil are easily obtainable, as above described.

Although a cylindrical surface is preferred for the capacitor stack, there are applications in which a conical surface might be desired, and my invention in its broader aspects is intended to comprehend capacitors with such surface configurations.

While I have shown and described a particular embodiment of my invention, it will be obvious to those skilled in the art that various changes and modifications may be made without departing from my invention in its broader aspects; and I, therefore intend in the appended claims to cover all such changes and modifications as fall within the true spirit and scope of my invention.

What I claim as new and desire to secure by Letters Patent of the United States is:

1. A method of making a high voltage ceramic capacitor assembly comprising:
   a. providing a plurality of ceramic capacitor blocks, each having an outer peripheral surface, a pair of opposed substantially planar faces extending transversely thereof, and a conductive coating bonded to each of said planar faces,
   b. bonding said capacitor blocks together in generally aligned face-to-face relationship to form a stack in which each block has one of its conductive coatings adherently bonded to one of the conductive coatings on an adjacent block, c. machining the periphery of said stack so as to remove sufficient material that said coatings have their peripheral edges precisely aligned with the periphery of the ceramic immediately there adjacent about the entire peripheral edge of each coating, d. the conductive coating on the face of each block being sufficiently extensive that the peripheral edge of the coating after said stack is machined extends about the entire periphery of the stack.

2. The method of claim 1 in which said machining operation is an abrading operation.

3. The method of claim 1 in which said machining operation is a grinding operation performed on a work-rotating machine tool.

4. A method as defined in claim 1 and further comprising:
a. bonding to each of the conductive coatings at the outer ends of said stack an end block of electrical insulating material having a surface abutting said coating about substantially the entire outer peripheral region of said coating,
b. then machining the periphery of each of said end blocks, said juxtaposed conductive coating, and the adjacent ceramic block sufficiently to achieve in the region of said coating precise alignment between the outer peripheral surfaces of said coating and said adjacent ceramic block about the entire peripheral surface of said coating.

5. A method of making a high voltage ceramic capacitor assembly comprising:
a. providing a ceramic capacitor block having an outer peripheral surface, a pair of opposed substantially planar surfaces extending transversely thereof, and a conductive coating bonded to each of said planar faces,
b. bonding to each of said conductive coatings an end block of electric insulating material having a face abutting said coating about substantially the entire outer peripheral region of said coating,
c. then machining the peripheries of said end blocks, said juxtaposed metal coatings, and the ceramic block sufficiently to achieve in the region of each of said coatings precise alignment between the outer peripheral surface of said coating and said ceramic block about the entire peripheral surface of said coating.

6. A high voltage ceramic capacitor assembly comprising:
a. a stack of ceramic capacitor blocks electrically connected in series, each having an outer peripheral surface, a pair of opposed substantially planar faces extending transversely thereof, and a conductive coating bonded to each of said planar faces,
b. one of the conductive coatings on each capacitor block having a face in juxtaposition to a face of one of the coatings on an immediately-adjacent capacitor block,
c. bonding means providing an adherent bond between said juxtaposed coatings securing said ceramic blocks together with the peripheral surfaces of adjacent ceramic blocks in precisely-aligned relationship,
d. each of said ceramic blocks having a substantially chip-free peripheral surface immediately adjacent the conductive coatings thereon,
e. each of said conductive coatings having a chip-free peripheral edge extending about the entire outer periphery of said stack in precisely-aligned relationship with the peripheral surface of the ceramic capacitor material there adjacent,
f. a thin coating of insulating material covering the peripheral edge of each of said conductive coatings and the immediately adjacent peripheral surface of the ceramic blocks adjacent said conductive coating, the juxtaposed faces of each of said conductive coatings between said ceramic capacitor blocks being free of insulating coating of a thickness greater than 15 mils,
g. the maximum misalignment between the peripheral edge of all of the conductive coatings and the adjacent peripheral surface of the ceramic capacitor blocks being less than 5 mils,
h. said juxtaposed conductive coatings being less than 15 mils apart and so close together as to substantially prevent the presence of lines of electric flux emanating from the region between said juxtaposed coatings and crowding around the peripheral edge of a conductive coating as they enter the ceramic when a high voltage is applied between the ends of said stack.

7. The high voltage ceramic capacitor assembly of claim 6 in which the maximum misalignment between the peripheral edge of all of the conductive coatings and the adjacent peripheral surface of the ceramic capacitor blocks is less than 2 mils.

8. The high voltage ceramic capacitor assembly of claim 6 in which the periphery of said stack, considered without said dielectric coating, has a surface smoothness in the region of each of said conductive coatings corresponding to that resulting from grinding smooth said peripheral surface regions on a work-rotating grinding machine.

9. The high voltage ceramic capacitor assembly of claim 6 in which the space between the juxtaposed substantially planar faces of adjacent capacitor blocks is less than 15 mils.

10. The high voltage capacitor assembly of claim 6 in which the space between the juxtaposed substantially planar faces of adjacent ceramic capacitor blocks is less than 5 mils.

11. A high voltage ceramic capacitor assembly comprising:
a. a stack of ceramic capacitor blocks electrically connected in series, each having an outer peripheral surface, a pair of opposed substantially planar faces extending transversely thereof, and a conductive coating bonded to each of said planar faces,
b. one of the conductive coatings on each capacitor block being in juxtaposed position to one of the coatings on an immediately-adjacent capacitor block,
c. bonding means providing an adherent bond between said juxtaposed coatings securing said ceramic blocks together with the peripheral surfaces of adjacent ceramic blocks in precisely-aligned relationship,
d. each of said ceramic blocks having a substantially chip-free peripheral surface immediately adjacent the conductive coatings thereon,
e. each of said conductive coatings having a substantially chip-free peripheral edge extending about the entire outer periphery of said stack in precisely aligned relationship with the peripheral surface of the ceramic capacitor material there adjacent,
f. a thin coating of insulating material covering the peripheral edge of each of said conductive coatings and the immediately adjacent peripheral surface of the ceramic blocks adjacent said conductive coating,
g. the maximum misalignment between the peripheral edge of all of the conductive coatings and the adjacent peripheral surface of the ceramic capacitor blocks being less than 5 mils,
h. said juxtaposed conductive coatings being so close together as to substantially prevent the presence of lines of electric flux emanating from the region between said juxtaposed coatings and crowding around the peripheral edge of a conductive coating as they enter the ceramic when a high voltage is applied between the ends of said stack,
i. a pair of end blocks of electrical insulating material at opposite ends of said stack, each having a surface bonded to one of the conductive coatings at the outer end of said stack and abutting said outer end coating about substantially the entire outer peripheral region of said coating,
j. the periphery of each of said outer end coatings being substantially free of chips and having a peripheral edge extending about the entire periphery of said stack in precisely-aligned relationship with the peripheral surface of the ceramic capacitor material and the end block material there adjacent.

12. A high voltage ceramic capacitor unit comprising:
a. a ceramic capacitor block having an outer peripheral surface, a pair of opposed substantially planar faces extending transversely of said peripheral surface, and a conductive coating bonded to each of said planar faces, b. a pair of end blocks of electrical insulating material, each having a surface bonded to one of the conductive coatings on said ceramic block and abutting said coating about substantially the entire outer peripheral region of said coating, c. said ceramic block and said end blocks together forming a stack, d. the periphery of each of said conductive coatings being substantially free of chips and having a peripheral edge extending about the entire periphery of said stack in precisely-aligned relationship with the peripheral surface of the ceramic capacitor material and the end block material there adjacent, e. a thin coating of insulating material covering the peripheral edge of each of said conductive coatings and the immediately adjacent peripheral surface of the ceramic block adjacent said conductive coating.

13. A high voltage capacitor assembly comprising a plurality of series-connected capacitor units each constructed as defined in claim 12, said capacitor units being disposed in stacked relationship with conductive buttons located between adjacent capacitor units and contacting the conductive coatings thereon, said end blocks of insulating material that are located between said ceramic blocks being of annular form so as to leave a central portion of the associated conductive coatings bare to permit contact thereof by the associated button.

14. A high voltage ceramic capacitor assembly comprising:

a. a stack of ceramic capacitor blocks electrically connected in series, each having an outer peripheral surface, a pair of opposed substantially planar faces extending transversely thereof, and a conductive coating bonded to each of said planar faces, b. one of the conductive coatings on each capacitor block being in juxtaposition to one of the coatings on an immediately-adjacent capacitor block, c. bonding means providing an adherent bond between said juxtaposed coatings securing said ceramic blocks together with the peripheral surfaces of adjacent ceramic blocks in precisely-aligned relationship, d. each of said ceramic blocks having a substantially chip-free peripheral surface immediately adjacent the conductive coatings, thereon, e. each of said conductive coatings having a substantially chip-free periphery of said stack in precisely aligned relationship with the peripheral surface of the ceramic capacitor material there adjacent, f. a thin coating of insulating material covering the peripheral edge of each of said conductive coatings and the immediately adjacent peripheral surface of the ceramic blocks adjacent said conductive coating, g. the maximum misalignment between the peripheral edge of all of the conductive coatings and the adjacent peripheral surface of the ceramic capacitor blocks being less than 5 mils, h. said juxtaposed conductive coatings being so close together as to substantially prevent the presence of lines of electric flux emanating from the region between said juxtaposed coatings and crowding around the peripheral edge of a conductive coating as they enter the ceramic when a high voltage is applied between the ends of said stack, and i. end terminals respectively contacting the conductive coatings at the ends of said stack, said end terminals and all other conductive structure immediately adjacent the conductive coatings at the ends of said stack being located radially inwardly of the outer peripheries of said end conductive coatings.

15. The method of claim 4 in which machining of the periphery of each end block, juxtaposed conductive coating bonded thereto, and adjacent ceramic block produces in the region of said coating precise-alignment between the outer peripheral surfaces of said end block, said coating, and said adjacent ceramic block about the entire peripheral surface of said coating.

16. The method of claim 5 in which machining of the periphery of each end block, juxtaposed conductive coating bonded thereto, and adjacent ceramic block produces in the region of said coating precise-alignment between the outer peripheral surfaces of said end block, said coating, and said adjacent ceramic block about the entire peripheral surface of said coating.